United States Patent [19]

Sakamoto

[11] Patent Number: 5,386,161
[45] Date of Patent: Jan. 31, 1995

[54] PERMANENT MAGNET STEPPING MOTOR

[75] Inventor: Masafumi Sakamoto, Kiryu, Japan

[73] Assignee: Japan Servo Co., Ltd., Tokyo, Japan

[21] Appl. No.: 52,242

[22] Filed: Apr. 20, 1993

[30] Foreign Application Priority Data

Apr. 20, 1992 [JP] Japan .............................. 4-032722[U]
Apr. 15, 1993 [JP] Japan .............................. 5-111178

[51] Int. Cl.⁶ ............................................ H02K 37/14
[52] U.S. Cl. .................................... 310/49 R; 310/156
[58] Field of Search ........................ 310/49 R, 156

[56] References Cited

U.S. PATENT DOCUMENTS

| | | | |
|---|---|---|---|
| 4,381,465 | 4/1983 | Renkl et al. | 310/49 R |
| 4,672,253 | 6/1987 | Tajima et al. | 310/269 |
| 4,999,559 | 3/1991 | Katz | 318/696 |
| 5,043,613 | 8/1991 | Kurata et al. | 310/49 R |
| 5,128,570 | 7/1992 | Isozaki | 310/49 R |
| 5,280,209 | 1/1994 | Leupold et al. | 310/156 |

Primary Examiner—Steven L. Stephan
Assistant Examiner—Judson H. Jones
Attorney, Agent, or Firm—Oblon, Spivak, McClelland, Maier & Neustadt

[57] ABSTRACT

The invention relates to a structure of a three-phase permanent magnet stepping motor in which vibration and noise can be reduced and lowering of its output can suppressed even in a high-pulse region. To this end, the motor has a three-phase, six-pole, permanent magnet stator structure, and a rotor structure having alternately arranged N and S poles the total number P of which is selected to satisfy the conditional equation of $P = 12n \pm 4$ (n being a positive integer).

The present invention is applicable to both the inner-rotor and outer-rotor structures. Further, in both the cases of the inner- and outer-rotor structures, the alternate arrangement of N and S magnetic poles of the rotor may be realized by an arrangement using a two-pole magnetized permanent magnet constituted by a combination of two claw poles, in place of the arrangement in which N and S magnetic poles are formed by directly magnetizing the outer or inner circumferential surface of a cylindrical magnet.

9 Claims, 7 Drawing Sheets

| A', B', C' | MAGNETIC POLE |
|---|---|
| a, b, c | INPUT TERMINAL |
| N, S | POLARITY |

FIG. 6

| A', B', C' | MAGNETIC POLE |
|---|---|
| a, b, c | INPUT TERMINAL |
| N, S | POLARITY |

|   | P = 12n−4 | | P = 12n+4 | |
|---|---|---|---|---|
| n | P | θs | P | θs |
| 1 | 8 | 15° | 16 | 7.5° |
| 2 | 20 | 6° | 28 | 4.285 |
| 3 | 32 | 3.75° | 40 | 3.1 |
| 4 | 44 | 3.727° | 52 | 2.307 |
| ∫ | | | | |
| 8 | 92 | 1.304° | 100 | 1.2 |

FIG.IIA

FIG.IIB

PERMANENT MAGNET STEPPING MOTOR

BACKGROUND OF THE INVENTION

1. Field of the Invention

The present invention relates to a permanent magnet stepping motor which is small in vibration as well as in rotational fluctuation and which is high in output torque, and particularly relates to a stepping motor which is suitable for direct driving.

2. Description of the Prior Art

Figure 1:
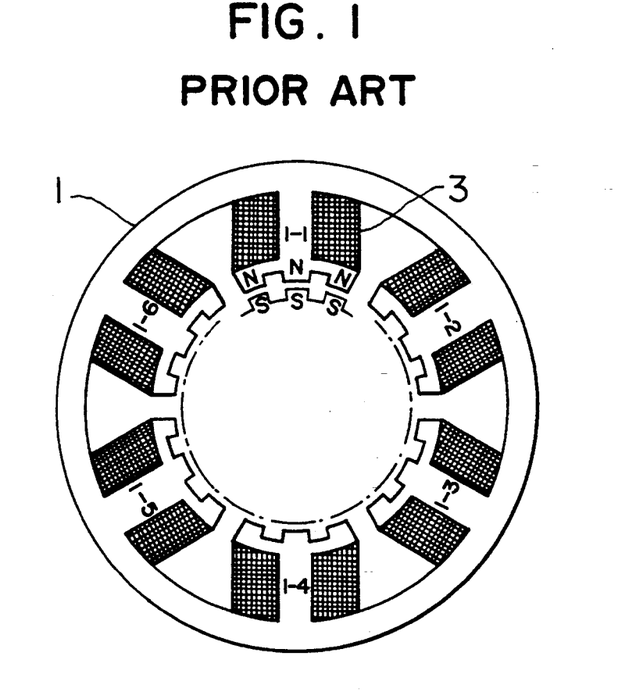
FIG. 1 Is a cross section showing a prior art stepping motor.
Figure 2:
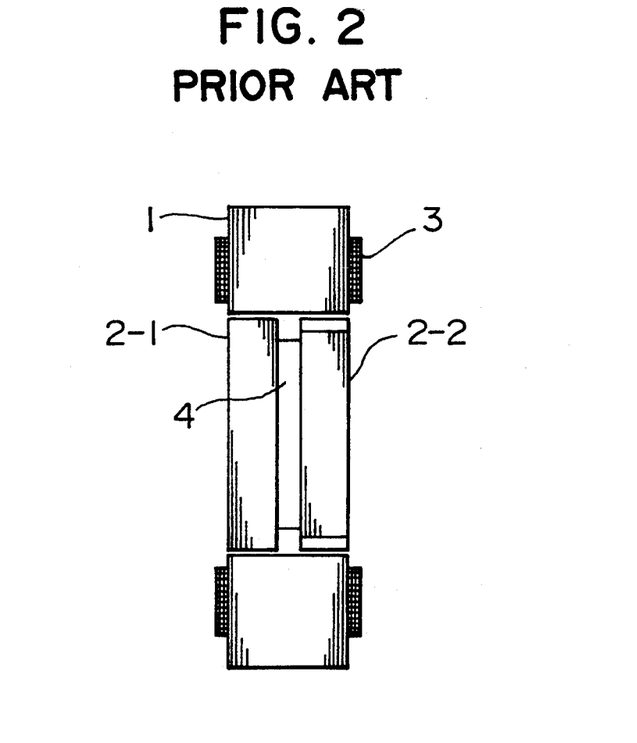
FIG. 2 is a longitudinally sectional front view showing the prior art stepping motor of FIG. 1.

Referring to FIGS. 1 and 2, the contents and configuration of the conventional technique of the stepping motor will be described.

Stepping motors have been widely used for inexpensive positioning, inexpensive velocity controlling, and inexpensive constant-speed synchronization controlling, because they can be used in an open loop.

Recently, as a low cost actuator for constant-speed synchronization control, a stepping motor is begun to be used, in place of a brushless DC motor, for driving a drum in a laser beam printer or the like.

Compared with a brushless DC motor, however, stepping motors are generally large in vibration as well as in noise, and how to reduce such vibration and noise has become a problem to be solved.

In the market, a two-phase hybrid stepping motor and a two-phase bobbin coil system permanent magnet stepping motor of the claw pole type and can stake type have been handled widely. However, the stepping motor of the former type has such a disadvantage that it is large in vibration as well as in noise while it is high in output, and the stepping motor of the later type has such a disadvantage that the air gap between its rotor and stator cannot be so narrowed because its stator is of the claw pole type so that its output torque is small while it is comparatively small in vibration as well as in noise.

As one of measures to eliminate the foregoing disadvantages, there has been proposed a three-phase hybrid stepping motor. FIGS. 1 and 2 show the structure of such a three-phase hybrid stepping motor.

FIG. 1 is a cross section showing the stepping motor cut in the direction perpendicular to a rotary shaft thereof, and FIG. 2 is a longitudinally sectional front view of the stepping motor showing its stator in section but showing its rotor not in section.

In FIGS. 1 and 2, a stator 1 is constituted by six poles 1-1 through 1-6 and coils 3 are wound on the respective poles to form a three-phase winding.

Each of rotor magnetic bodies 2-1 and 2-2 is constituted by a lamination of magnetic iron plates or the like and is provided at its outer periphery with a plurality of salient pole magnetic teeth. The magnetic bodies 2-1 and 2-2 are arranged in a manner so that the magnetic bodies 2-1 and 2-2 sandwich a disc-like permanent magnet 4 therebetween and the magnetic bodies 2-1 and 2-2 are rotationally shifted from each other by a ½ tooth pitch in position of their magnetic teeth.

The permanent magnet 4 is magnetized in the rotary shaft direction in such manner that, for example, the magnetic body 2-1 becomes S pole and the magnetic body 2-2 becomes N pole respectively. In comparison with a two-phase hybrid stepping motor, a three-phase hybrid stepping motor has an advantage that its vibration during rotation is small, and it is superior in cost performance particularly in the case of six-pole structure. An example of this structure is disclosed, for example, in U.S. Pat. No. 5,128,570.

Such a conventional three-phase hybrid stepping motor has a problem that it has a vibration band in rotation yet in a low speed range lower than 300 rpm while it is small in vibration in comparison with a two-phase hybrid stepping motor. Further, even in a high speed range not lower than 300 rpm, the conventional three-phase hybrid stepping motor is inferior in vibration and noise property to a brushless motor. Further, the torque of the conventional three-phase hybrid stepping motor becomes low remarkably in the high speed range not lower than 300 rpm.

The reason why such a disadvantage is generated in such a conventional three-phase hybrid stepping motor is that since its rotor is of the hybrid type, each of the magnetic bodies 2-1 and 2-2 of FIG. 2 is constituted by a lamination of magnetic iron plates to thereby partially form a magnetic path and inductance viewed from the winding becomes larger so that an exciting current hardly flows to lower the torque as the input frequency to the stator coil becomes higher.

Further, one of the reasons why vibration is large in such a conventional three-phase hybrid stepping motor in comparison with a brushless motor or the like is that since its rotor has a hybrid structure, each of the magnetic bodies 2-1 and 2-2 has magnetic teeth and the distribution of magnetic flux in the air gap between the stator and rotor has a square or trapezoidal waveform in accordance with the shape of the teeth so that higher harmonic components of the waveform are induced.

SUMMARY OF THE INVENTION

In order to solve the foregoing problems in the conventional stepping motors, it is an object of the present invention to provide a permanent magnet stepping motor which is low in vibration as well as in rotational fluctuation and which is high in output torque.

It is another object of the present invention to provide a permanent magnet stepping motor which is inexpensive but can produce high output characteristic in comparison with a stepping motor of a hybrid structure.

It is a further object of the present invention to provide a permanent magnet stepping motor in which vibration and noise are extremely small in comparison with a stepping motor of a hybrid structure.

In order to attain the foregoing objects, the permanent magnet stepping motor according to the present invention has features that its stator has a six-pole structure attaching importance to cost performance, each of the six poles has two or more magnetic teeth at its radially inward forward end portion, the magnetic teeth on the respective poles are equal in number to each other, and its rotor is arranged so that the rotor is in opposition to the stator with an air gap therebetween and so that N and S magnetic poles of a permanent magnet are arranged alternately at equal pitches on the surface of the rotor opposing to the stator under the condition of $P=12n\pm4$ (n being a positive integer not smaller than 1) when the total number of the N and S poles is represented by P.

Other features of the present invention will be described in detail in embodiments which will be described later.

DETAILED DESCRIPTION OF THE PREFERRED EMBODIMENTS

Figure 3:
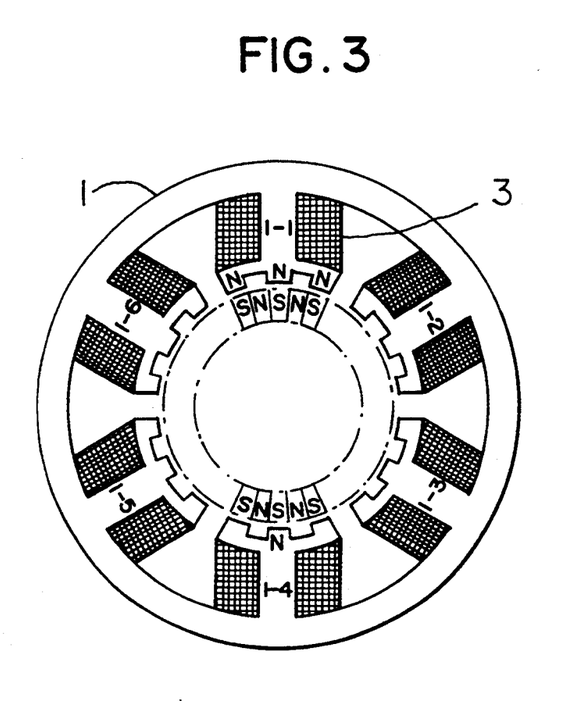
FIG. 3 is a cross section showing an embodiment of the stepping motor according to the present invention.
Figure 4:
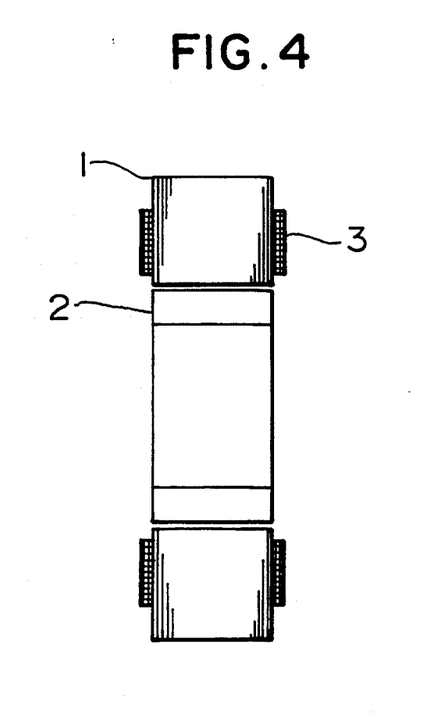
FIG. 4 is a longitudinally sectional front view showing the embodiment of the stepping motor of FIG. 3.

FIG. 3 is a cross section showing a stepping motor of the present invention which is cut in the direction perpendicular to a rotary shaft thereof, and FIG. 4 is a longitudinal sectional front view of the same stepping motor showing its stator in section but showing its rotor not in section.

A stator 1 is the same as the conventional one shown in FIG. 1. The stator 1 is constituted by six poles disposed at equal pitches, and each of the six poles has magnetic teeth at its radially inward forward end portion. That is, specifically, each of the six poles having two or more magnetic teeth at its radially inward forward end portion, the magnetic teeth in the respective poles being equal in number to each other, the magnetic teeth being substantially opposite to magnetic poles of its rotor 2.

A coil 3 is wound on each of stator magnetic poles so as to form a three-phase winding as a whole. A winding for a first phase is wound on the stator magnetic poles 1-1 and 1-4 so that the magnetic poles 1-1 and 1-4 are magnetized with the same polarity.

Similarly to this, a winding for a second phase is wound on the magnetic poles 1-2 and 1-5 and a winding for a third phase is wound on the magnetic poles 1-3 and 1-6. A rotor 2 has N and S magnetic poles which are arranged alternately and at equal pitches. One of the features of the present invention is in that the total number P of the rotor poles may be selected so as to satisfy the following condition:

$$P = 12n \pm 4 \quad (1)$$

where n is a positive integer not smaller than 1.

Generally, a three-phase winding requires two feeding terminals or lead wires for each phase, that is, six feeding terminals or lead wires as a whole. The motor according to the present invention can be driven even in the case of three terminals or three lead wires with star connection as shown in FIG. 5 or delta connection as shown in FIG. 6.

Figure 5:
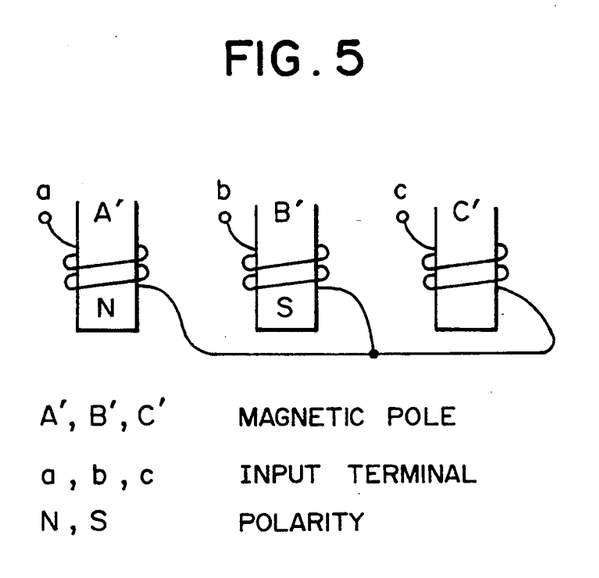
FIG. 5 is a diagram showing an example of connection according to the present invention.

For example, assuming that excitation is made so that the terminal a is plus and the terminal b is minus in FIG. 5, the magnetic poles A' and B' become N and S poles respectively to thereby provide two-phase excitation. Next, for example, the excitation is switched so that the terminal b is cut off, and the terminal a is left as it is, and the terminal c becomes minus, and then the excitation is further switched so that the terminal a is cut off, the terminal c is left as it is, and the terminal b becomes plus. As a result, the motor can be rotated.

Figure 6:
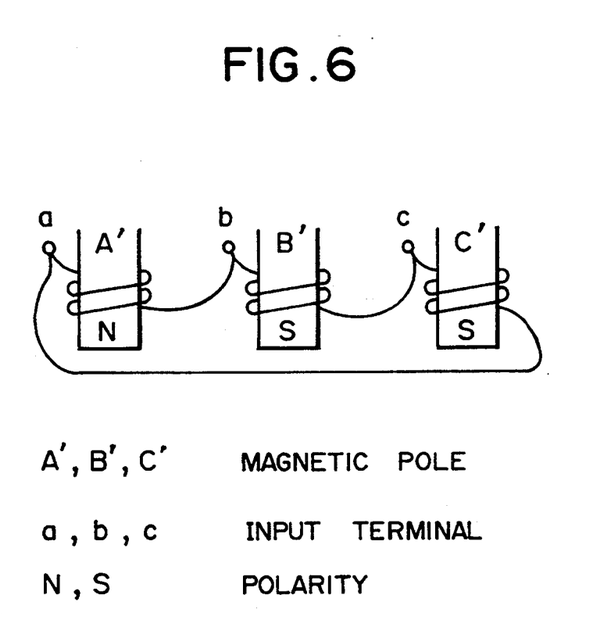
FIG. 6 is a diagram showing another example of connection according to the present invention.

In FIG. 6, on the other hand, if excitation is made so that the terminal a is plus and the terminal b is minus, three-phase excitation is realized. Similarly to the case of FIG. 5, the excitation is switched so that the terminal b is cut off and the terminal a is left as it is, and the terminal c becomes minus, and then the excitation is switched so that the terminal a is cut off, the terminal c is left as it is, and the terminal b becomes plus. As a result, the motor can be rotated.

Figure 7:
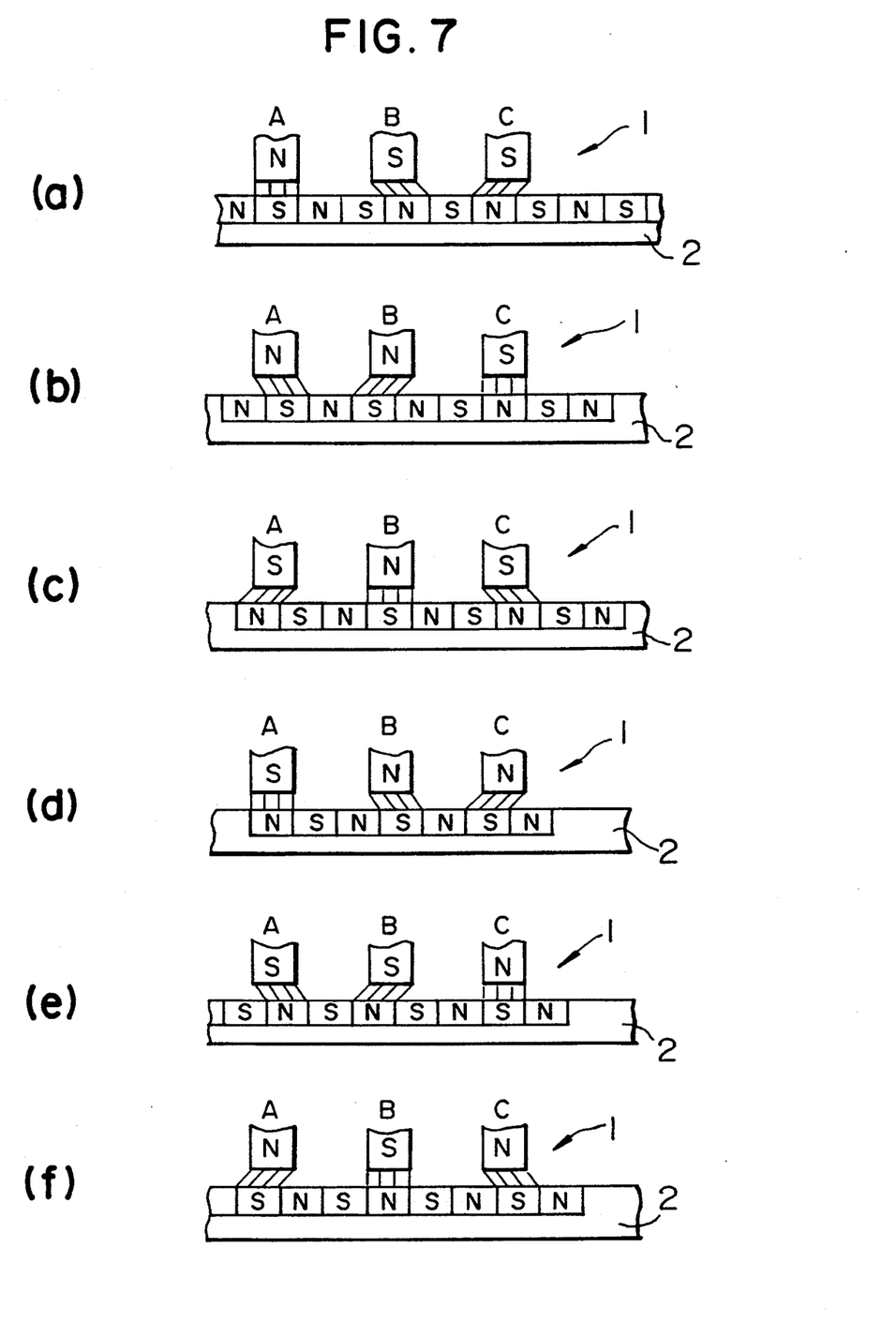
FIGS. 7a-7f are diagrams for explaining the principle of operation of a stepping motor to which the present invention is applied.

FIG. 7 is a diagram for explaining the principle of operation for driving a permanent magnet stepping motor to which the present invention is applied with the above-mentioned three-phase excitation system in FIG. 6. For the sake of simplification in illustration, however, only the three poles 6-1 through 6-3 of the six poles are illustrated. In FIG. 7, it will be understood that if excitation is performed so that the stator poles A, B, and C have illustrated polarities in the order of the diagrams (a)≃(f), the rotor 2 moves right with a step angle of ⅓ as long as the pitch of the N and S poles. That is, the step angle is 360°/3 P.

Next, it will be proved that the above equation (1) $P = 12n \pm 4$, which is the constituent condition of the present invention, is a conditional expression significant in technical viewpoint.

The prior condition for the equation (1) is the following equation (2).

$$[360/\{(P \times 6)/2\}] = \pm[(360/6) - \{360/(P/2)\}\{n \mp (\tfrac{1}{3})\}] \quad (2)$$

In the equations (1) and (2), the double signs ± in the equation (1) and ± and ∓ in the equation (2) correspond to each other in the same order, that is, the sign "+" in the equation (1) corresponds to the signs "+" and "−" in the equation (2) in order, while the sign "−" in the equation (1) corresponds to the signs "−" and "+" in the equation (2) in order.

The left side of the equation (2) expresses the above-mentioned step angle of the stepping motor according to the present invention. Further, 360°/6, which is the first term within the parenthesis in the right side, expresses the divisional angle of the stator six poles. The second term within the parenthesis expresses a value obtained by generalizing, with a positive integer n, an angle between the rotor magnetic tooth which is opposite to the stator magnetic tooth of the first phase (for example, the phase A in the diagram (a) of FIG. 7) and the rotor magnetic tooth which is nearest the stator magnetic tooth of the second phase (the phase B in the diagram (a) of FIG. 7) and which is different in polarity from the first-mentioned rotor magnetic tooth opposite to the stator magnetic tooth of the first phase.

Accordingly, also the right side of the equation (2) expresses the step angle of the stepping motor according to the present invention, and this equation (2) is therefore justified.

By arranging the equation (2), the conditional equation (1) $P=12n\pm 4$ can be obtained.

Thus, the stepping motor according to the present invention is imoperative unless the conditional equation (1) is satisfied, and the equation (1) is therefore a necessary condition for the present invention.

Figure 8:
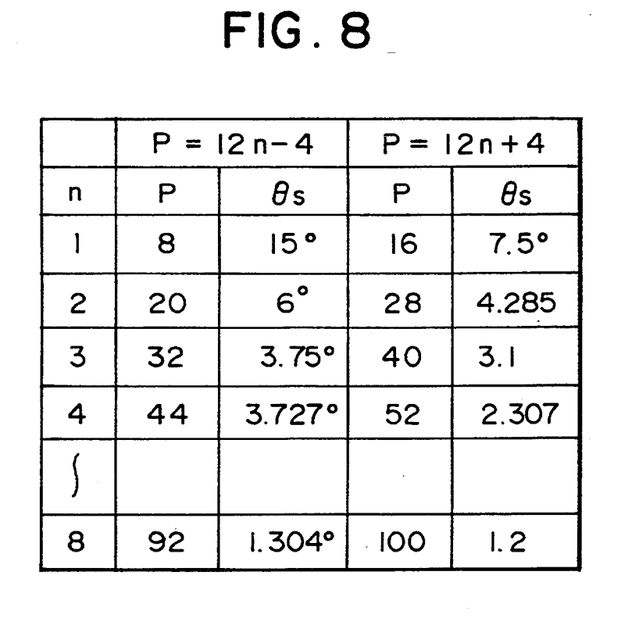
FIG. 8 is a table showing the relationship between the number of poles and step angles a stepping motor to which the present invention is applied.

FIG. 8 shows the step angles $\theta_S$ when the value of n in the equation $P=12n\pm 4$ is varies. For example, $\theta_S=7.5°$ and $\theta_S=15°$ are obtained when $n=1$. As seen from FIG. 8, the values of $\theta_S$ include many integers and the utilization rate thereof is therefore high.

Further, the present invention can be applied also to an outer-rotor type stepping motor (not shown) in which its rotor and its stator are reversed in position to each other. In this case of an outer-rotor type stepping motor, the arrangement positions of the rotor and stator shown in FIGS. 3 and 4 are exchanged to each other. That is, the stepping motor of this case is constituted by a stator having six salient poles provided at equal pitches and having a three-phase winding wound on the salient poles, and a rotor disposed so as to be in opposition to the outer circumferential surface of the stator with a gap therebetween, the rotor being constituted by a cylindrical permanent magnet having an inner circumferential surface on which equivalent N and S magnetic poles are magnetized alternately. Each of the salient poles of the stator has, on its outer circumferential surface, two or more of magnetic teeth, and the total number P of the magnetic poles of the rotor is selected so as to satisfy the conditional equation $P=12n\pm 4$ (n being a positive integer not smaller than 1).

Figure 9:
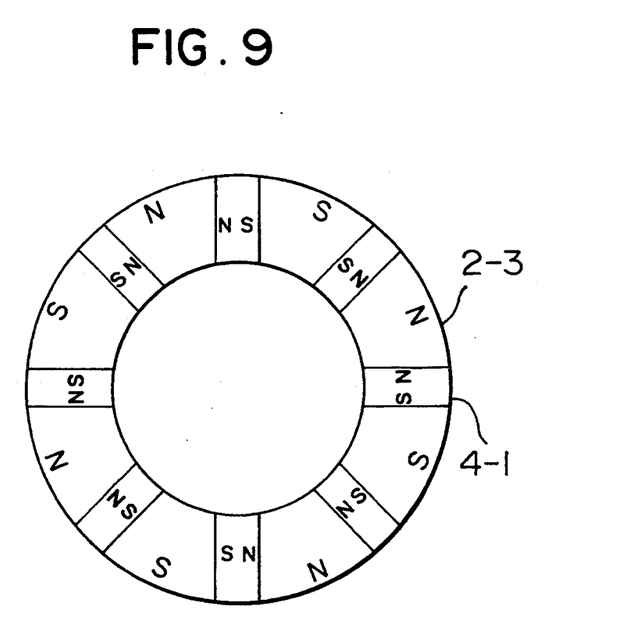
FIG. 9 is a cross section of a rotor showing another embodiment of the present invention.

FIG. 9 shows a further embodiment of the present invention. As shown in FIG. 9, a rotor has a structure in which rotor magnetic bodies 2-3 constituted by magnetic iron pieces and permanent magnets 4-1 are alternately arranged to form a cylindrical rotor structure in a manner so that the rotor magnetic bodies 2-3 are radially and alternately magnetized to be N and S poles as shown in FIG. 9. In this case, the number P of the rotor magnetic bodies 2-3 and the same number P of the permanent magnets 4-1 are selected so as to satisfy the conditional equation $P=12n\pm 4$ (n being a positive integer not smaller than 1).

Figure 10A:
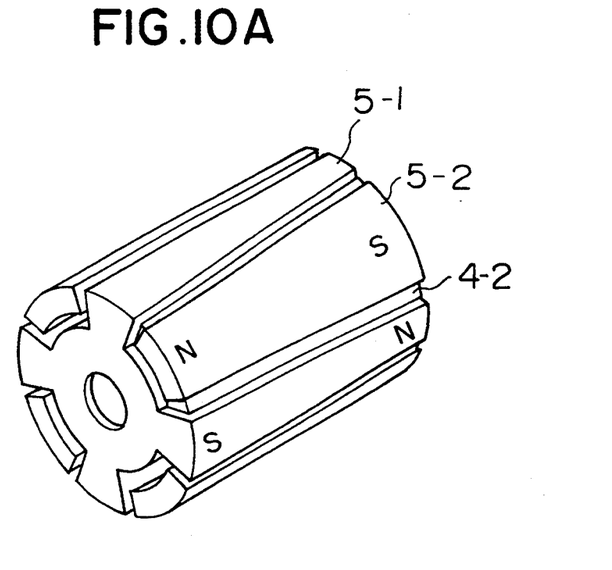
FIGS. 10A and 10B are a perspective view and a longitudinal sectional front view respectively, showing a rotor of the inner-rotor type as a further embodiment of the present invention.
Figure 10B:
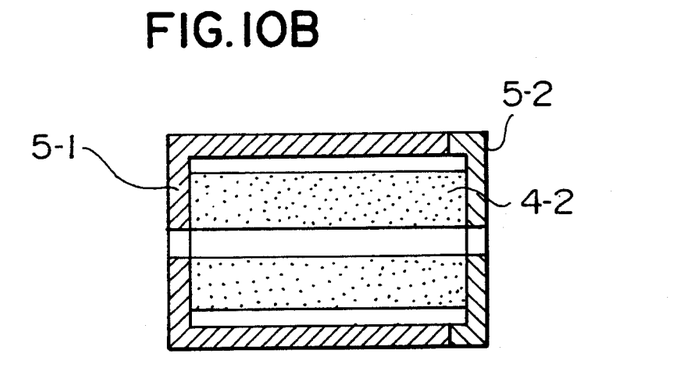

In place of the above-mentioned N-S alternate arrangement of rotor in which N and S magnetic poles are formed by directly magnetizing the outer or inner circumferential surface of a cylindrical magnet, it is possible to use such an inner-rotor type rotor structure as shown in FIGS. 10A and 10B in which two claw pole members 5-1 and 5-2 are combined with a permanent magnet 4-2 sandwiched therebetween. The permanent magnet 4-2 is magnetized axially in two poles.

Figure 11A:
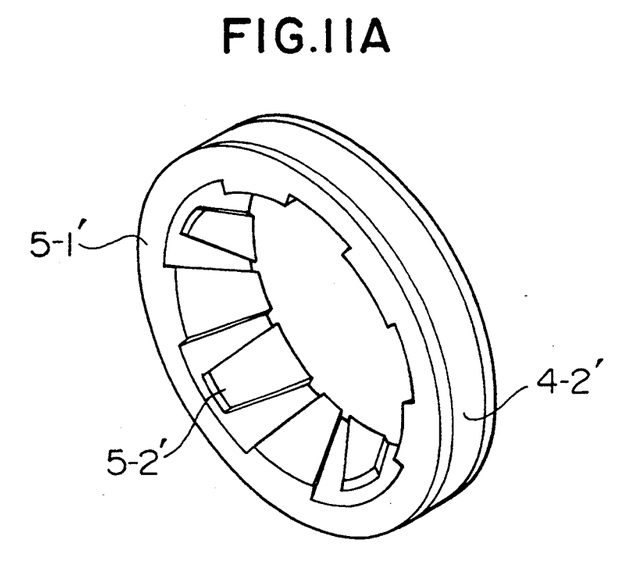
FIGS. 11A and 11B are a perspective view and a longitudinal sectional front view respectively, showing a rotor of the outer-rotor type as a still further embodiment of the present invention.
Figure 11B:
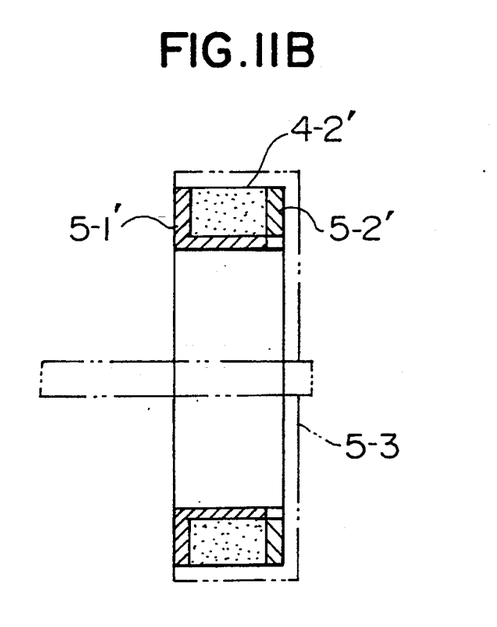

FIGS. 11A and 11B show a rotor of the outer-rotor type as a further embodiment of the present invention. In this rotor, the parts corresponding to those in FIGS. 10A and 10B are denoted with dashes. Further, the reference numeral 5-3 illustrated with a dotted lines designates a rotor holder made of a non-magnetic material, together with rotary shaft (not shown in FIG. 11A).

Having such a configuration as described above, the stepping motor according to the present invention has an advantage that since the rotor thereof is of the permanent magnet type which is not provided with such magnetic bodies 2-1 and 2-2 as shown in the prior art of FIG. 2, the inductance of the motor is not high and the lowering of torque in a high-frequency region is smaller than that in a hybrid type stepping motor, and has a further advantage that since N and S magnetic poles alternately magnetized on the permanent magnet surface are used, the distribution of magnetic flux in the air gap is sinusoidal so that the higher harmonic components contained therein is less, and vibration and noise are also less in comparison with the hybrid type stepping motor.

Generally, in a case where a permanent magnet is magnetized so as to have alternately arranged N and S poles, the magnetic flux density becomes highest in the center of the magnetization width of each of the N and S poles, and it decreases gradually symmetrically as the position comes away from the center so that it becomes zero on the boundary line between adjacent N and S poles. In this case, since the N and S poles are opposite in polarity to each other, the distribution of the magnetic flux density becomes sinusoidal. According to the present invention, this characteristic is utilized in combination with a hybrid stepping motor.

The stepping motor according to the present invention has a further advantage that the facing area between the rotor magnetic teeth and the stator teeth is about twice or more as large as that in a hybrid type stepping motor and therefore permeance from the rotor side can be obtained to an extent substantially the same as that in the hybrid type stepping motor even if the air gap is not made to be so small as in the hybrid type stepping motor.

The disadvantages of the conventional stepping motor is caused by the fact that, as seen from FIGS. 1 and 2, it has been necessary that the respective magnetic teeth of the rotor magnetic bodies 2-1 and 2-2 are shifted from each other by a ½ tooth pitch, so that, for example, the magnetic teeth of the magnetic body 2-2 cannot be opposite to the magnetic teeth of the stator which are in opposition to the magnetic teeth of the magnetic body 2-1, and caused by the further fact that in the width portion in the direction of the rotary shaft there are no magnetic poles opposite to the stator.

Having such a configuration as described above, the three-phase stepping motor according to the present invention has excellent effects as follows.

(1) Since the rotor is constituted by a cylindrical magnet of the permanent magnet type having an alternate N-S pole arrangement, low-cost and high-output characteristics can be obtained in comparison with the hybrid type. In an experiment, it has been confirmed that the output of the stepping motor according to the present invention is about 1.5 times as high as that of a hybrid type stepping motor.

(2) Since the distribution of the magnetic flux density in the air gap is sinusoidal, vibration and noise are extremely less in the stepping motor according to the present invention in comparison with a hybrid type stepping motor. In an experiment, it has been confirmed that vibration in the stepping motor according to the present invention is ½ or less as large as that in a hybrid type stepping motor.

(3) Since the rotor magnetic poles are arranged N and S alternately on the surface of the rotor, the magnetic flux passing from the rotor to the stator is 2 dimensions (no need for shaft direction), while that of prior art is 3 dimensions, because the magnetic flux has to pass in the direction of stator lamination.

This means that magnetic reluctance is small and the response can be made high in accordance with the present invention.

What is claimed is:

1. An inner-rotor type permanent magnet stepping motor comprising:
   a rotor constituted by a cylindrical permanent magnet having an outer circumferential surface which is magnetized so as to have equivalent N and S magnetic poles arranged alternately; and
   a stator disposed in opposition to said outer circumferential surface of said rotor through an air gap, said stator having equidistantly formed six salient poles and having a three-phase winding wound on said salient poles, each of said salient poles of said stator having at its inner circumferential surface at least two magnetic teeth so that said magnetic teeth of said salient poles are equal to each other in circumferential width or substantially equal in circumferential pitch to the respective N and S magnetic pole pairs of said rotor; and
   the total number P of said magnetic poles of said rotor being selected so as to satisfy the following conditional equation:

$P = 12n \pm 4$[(with n]with n being defined as a positive integer not smaller than 1

2. An inner-rotor type permanent magnet stepping motor according to claim 1, in which the number of feeding terminals led out from connection of said winding is selected to be three.

3. An outer-rotor type permanent magnet stepping motor comprising:
   a stator having equidistantly formed six salient poles and having a three-phase winding wound on said salient poles;
   a rotor disposed in opposition to an outer circumferential surface of said stator through an air gap, said rotor being constituted by a cylindrical permanent magnet having an inner circumferential surface which is magnetized so as to have equivalent N and S magnetic poles arranged alternately; and
   each of said salient poles of said stator having at its outer circumferential surface at least two magnetic teeth so that said magnetic teeth of said salient poles are equal to each other in circumferential width or substantially equal in circumferential pitch to the respective N and S magnetic pole pairs of said rotor;
   the total number P of said magnetic poles of said rotor being selected so as to satisfy the following conditional equation:

$P = 12n \pm 4$[(n]with n being a positive integer not smaller than 1

4. An outer-rotor type permanent magnet stepping motor according to claim 3, in which the number of feeding terminals led out from connection of said winding is selected to be three.

5. An inner-rotor type permanent magnet stepping motor according to claim 1 or 2, in which said motor comprises, in place of said rotor constituted by a cylindrical permanent magnet, a rotor constituted by a cylindrical structure composed of rotor magnetic bodies the total number of which is P and permanent magnets the total number of which is also P, said rotor magnetic bodies and and said permanent magnets being arranged alternatively in the circumferential direction of said cylindrical structure, said P rotor magnetic bodies being magnetized so as to be N and S poles alternately.

6. An inner-rotor type permanent magnet stepping motor comprising:
   a rotor constituted by a cylindrical permanent magnet having an outer circumferential surface which is magnetized so as to have equivalent N and S magnetic poles arranged alternately; and
   a stator disposed in opposition to said outer circumferential surface of said rotor through an air gap, said stator having equidistantly formed six salient poles and having a three-phase winding wound on said salient poles, each of said salient poles of said stator having at its inner circumferential surface at least two magnetic teeth;
   the total number P of said magnetic poles of said rotor being selected so as to satisfy the following conditional equation:

$P = 12n \pm 4$ with n being a positive integer not smaller than 1;

and
   the alternate N and S pole arrangement of said rotor being realized by using a combination of two claw-pole members together with a two-pole magnetized permanent magnet, in place of the cylindrical magnet having its outer circumferential surface magnetized directly.

7. An inner-rotor type permanent magnet stepping motor comprising:
   a rotor constituted by a cylindrical permanent magnet having an outer circumferential surface which is magnetized so as to have equivalent N and S magnetic poles arranged alternately; and
   a stator disposed in opposition to said outer circumferential surface of said rotor through an air jap, said stator having equidistantly formed six salient poles and having a three-phase winding would on said salient poles, each of said salient poles of said stator having at its inner circumferential surface at least two magnetic teeth;
   the total number P of said magnetic poles of said rotor being selected so as to satisfy the following conditional equation:

$P = 12n \pm 4$ with n being a positive integer not smaller than 1;

the number of feeding terminals led out from connection of said winding being selected to be three; and
   the alternate N and S pole arrangement of said rotor being realized by using a combination of two claw-pole members together with a two-pole magnetized permanent magnet, in place of the cylindrical magnet having its outer circumferential surface magnetized directly.

8. All outer-rotor type permanent magnet stepping motor comprising:
   a stator having equidistantly formed six salient poles and having a three-phase winding would on said salient poles;
   a rotor disposed in opposition to an outer circumferential surface of said stator through an air gap, said rotor being constituted by a cylindrical permanent magnet having an inner circumferential surface which is magnetized so as to have equivalent N and S magnetic poles arranged alternately;

each of said salient poles of said stator having at its outer circumferential surface at least two magnetic teeth;

the total number P of said magnetic poles of said rotor being selected so as to satisfy the following conditional equation:

$$P = 12n \pm 4 \text{ with n being a positive integer not smaller than 1;}$$

the alternate N and S pole arrangement of said rotor being realized by using a combination of two claw-pole members together with a two-pole magnetized permanent magnet, in place of the cylindrical magnet having its outer circumferential surface magnetized directly.

9. An outer-rotor type permanent magnet stepping motor comprising:

a stator having equidistantly formed six salient poles and having a three-phase winding wound on said salient poles;

a rotor disposed in opposition to an outer circumferential surface of said stator through an air gap, said rotor being constituted by a cylindrical permanent magnet having an inner circumferential surface which is magnetized so as to have equivalent N and S magnetic poles arranged alternately;

each of said salient poles of said stator having at its outer circumferential surface at least two magnetic teeth;

the total number P of said magnetic poles of said rotor being selected so as to satisfy the following conditional equation:

$$P = 12n \pm 4 \text{ with n being a positive integer not smaller than 1;}$$

the number of feeding terminals led out from connection of said winding being selected to be three; and the alternate N and S pole arrangement of said rotor being realized by using a combination of two claw-pole members together with a two-pole magnetized permanent magnet, in place of the cylindrical magnet having its outer circumferential surface magnetized directly.

* * * * *